Aug. 21, 1962     A. BONDS     3,049,858
APPARATUS AND METHOD FOR POSITIONING A HELICAL BAND
Filed Feb. 5, 1960     2 Sheets-Sheet 1

INVENTOR.
Albert Bonds,
BY
Byron, Hume, Groen & Clement
Attys.

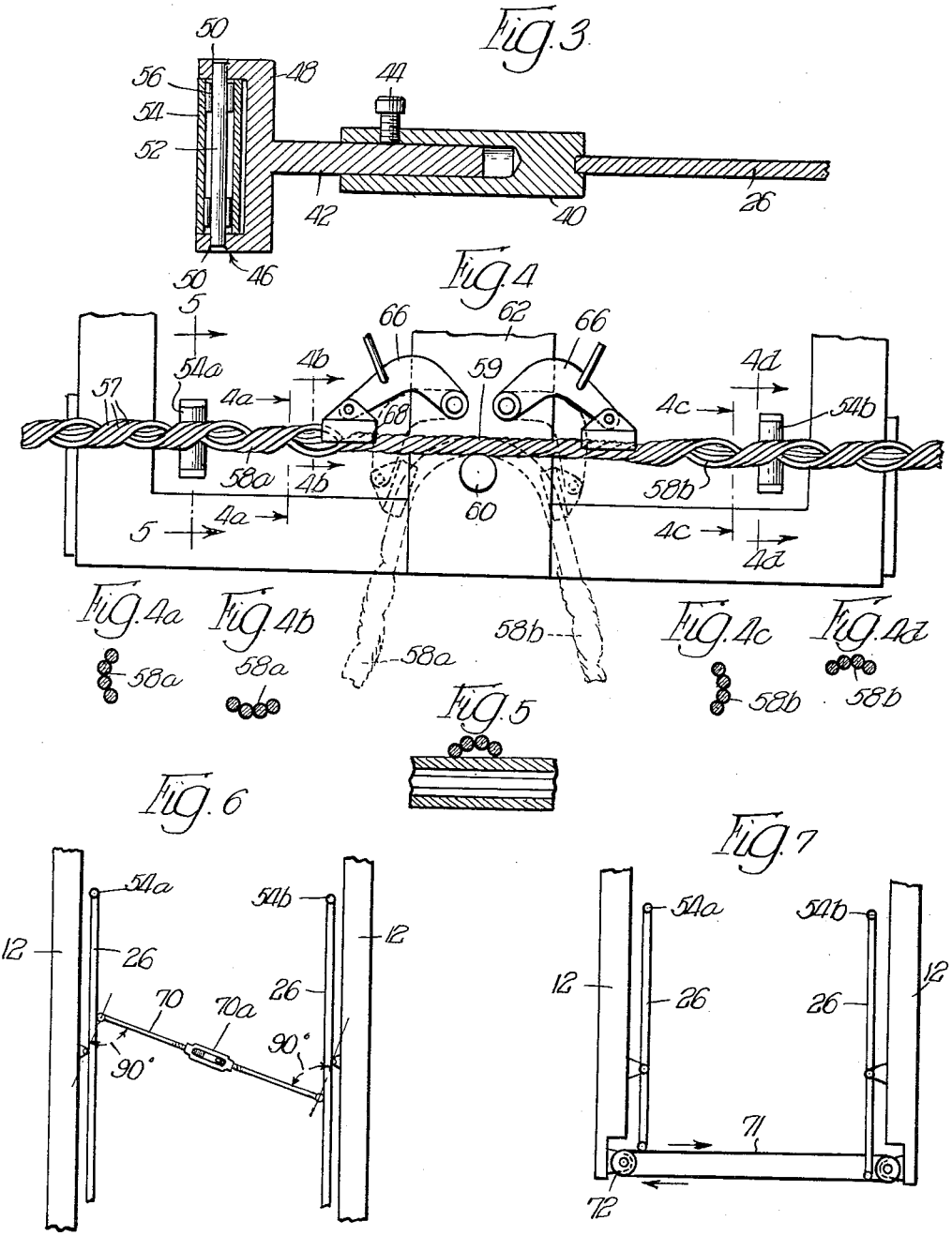

United States Patent Office 3,049,858
Patented Aug. 21, 1962

3,049,858
APPARATUS AND METHOD FOR POSITIONING
A HELICAL BAND
Albert Bonds, Cleveland, Ohio, assignor to Preformed
Line Products Company, Cleveland, Ohio, a corporation of Ohio
Filed Feb. 5, 1960, Ser. No. 6,966
11 Claims. (Cl. 57—55)

This invention relates to apparatus for manufacturing appliances used in the suspension of linear bodies, such as electrical conductors, cables, and the like, and more specifically to such appliances constructed of helical preformed elements.

In the United States Letters Patent to Thomas F. Peterson, No. 2,761,273, issued September 4, 1956, there are shown dead-ends for the suspension of linear bodies. These dead-ends consist of a bight portion and a body gripping portion in which the latter is adapted to grip the linear body, electrical conductor or the like, and in which the former is adapted to be secured to a pin, hook or other suspension device. The dead-ends are constructed in one preferred form of a half lay of helically preformed elements arranged in bridging relationship so as to form a helical band and in which the latter is return-bent to form the bight and so that the return-bent portions are in opposite phase relationship whereby they may be intertwisted so as to form a sheath which completely covers or at least partially covers the linear body. In the bight portion the dead-end may be constructed so that the helical elements form a helical band of open pitch, or alternatively, may be constructed so that the helical construction is of a closed pitch.

When the bight is constructed of an open helical band, it is merely necessary to assemble a half lay or less of the helical elements into a bridging relationship so as to form a helical band and then to place the band in association with a pin member at right angles thereto. The helical band, when brought into contact with the pin member will tend to rotate about its axis until it assumes a relationship with the pin whereafter if bent at a right angle to the pin, either about or away from the pin, the return-bent legs are opposite in phase so that they may be intertwisted to form the body gripping portion, as will be more fully described hereinafter. By bending around or away from a pin member it is meant that the portions of the band adjacent the ends thereof are brought into closely associated position, and in fact may even be in a touching or crossing relationship so as to facilitate the intertwisting. Thus, the band after bending includes two angles of approximately 90° each or a total of 180° and in which due to the aforementioned chordal relationship the legs are 180° out of phase or opposite in phase, thus providing the optimum meshing relationship.

When constructing the second named modification of the dead-end, the closed helix may be accomplished in any one of several ways. For example, the portion which forms the bight may be twisted so as to form the helix of a closed construction. Another example is that additional helically preformed elements may be added to those already utilized in the formation of the helical band to fill out the lay within the bight portion. In any event, regardless of the method used to form a closed helix, the latter will not tend to rotate about its axis until it assumes a position with respect to a pin member that will provide the opposing phase relationship of the return-bent legs. For this reason it is necessary to provide other means or methods for determining the point at and plane in which the helices should be bent in order that the return-bent legs are in opposite phase relationship.

One obvious method that has been proposed is to measure the helices and by that means determine the point at and plane in which they should be bent. However, it has been found that due to the irregularities and other discrepancies occurring in the metal used in the construction of the helices and the methods of manufacture, the normal manufacturing tolerances of the helical dimensions are such that measuring does not always provide the desired relationship between the return-bent legs. Furthermore, the measuring method does not position the band with respect to the pin and as a result is cumbersome and inefficient.

For this reason among others I have found it necessary to invent a new apparatus to be utilized in the construction of dead-end and other electrical appliances in which it is desirable to rotate the half set assembly of helically preformed elements relative to a plane in which they may be bent so that the bent portions will be of a desired phase relationship. This invention may be broadly characterized as a pair of spaced pivotally mounted devices which cause the helical band to rotate with respect to a preselected bending point so that the legs are in opposite phase relationship and thus may be intertwisted to form the body gripping portion of the dead-end.

Another feature and object of this invention resides in the provision of apparatus to be used in the construction of dead-ends and other appliances that is readily adapted to be used in conjunction with conventional equipment used in the construction of these appliances.

A still further feature and object of the invention resides in the provision of apparatus to be used in the construction of dead-ends and other appliances that is relatively simple in operation and requires little or no skill or technique on the part of the operator.

These and other features and objects of the invention will be apparent upon reading of the specification with reference to the following drawings.

In the drawings:

FIGURE 3 is a fragmentary view in section of one of the centering arms taken along the line 3—3 in FIGURE 2.

FIGURE 4 illustrates a plurality of helical elements which form an open helix adjacent their ends and a closed helix adjacent their longitudinal centers, being located with respect to a pin and bent about the same and in which the locating apparatus is shown in combination with one form of bending apparatus.

FIGURES 4a, 4b, 4c and 4d are sectional views taken along section lines designated the same in FIGURE 4.

FIGURE 5 is a sectional view taken along 5—5 in FIGURE 4.

FIGURE 6 is a diagrammatic illustration of a modification of the invention.

FIGURE 7 is a diagrammatic illustration of another modification of the invention.

For purposes of convenience the aforementioned relationship which the helical band assumes when placed in right angle association to the pin member will be referred to hereinafter as a "chordal relationship." This relationship can best be visualized by referring to FIGURE 5 which shows a cross-sectional view of a partial lay of helical elements arranged in bridging relationship so as to form a helical band and then placed in a right angular association with a pin member. The partial lay of helical elements when in the bridging relationship constitutes an arcuate section of a circle along any cross-section at right angles to the helical axis. When the band is placed in right angle engagement with a pin member, the latter will rotate about its axis without longitudinal movement until it assumes a chordal relationship with the circular section formed by the helical elements. It will be noted that when in the chordal relationship, the pin will contact the leading and trailing edges of the band in the cross-section of association; in this instance, the first and last helical elements of the partial lay. As was mentioned, if the partial lay is bent around the pin after the chordal relationship has been assumed, the return-bent portions will be of opposite phase so that they can be intertwisted.

Figure 1:
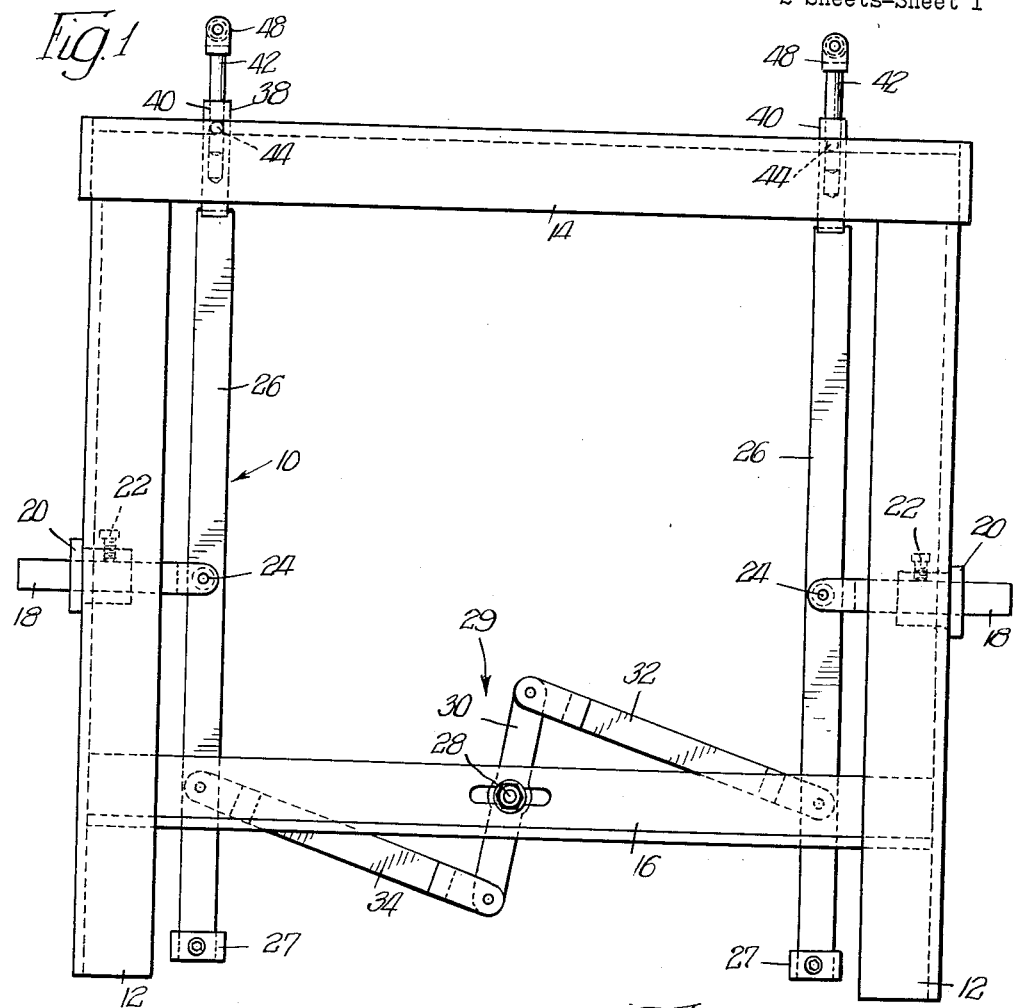
FIGURE 1 is a front view in elevation of the centering device embodying the invention.
Figure 2:
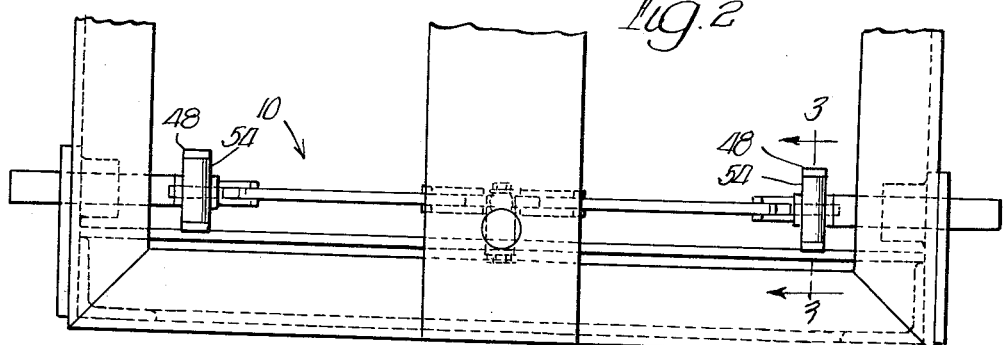
FIGURE 2 is a partial plan view of the apparatus shown in FIGURE 1.

Referring now to FIGURES 1 and 2, there is shown a preferred form of the apparatus embodying the invention, generally denoted by the numeral 10. It will be apparent upon reading of the application that the invention may be constructed of conventional materials that have the necessary strength and other physical characteristics suitable for the particular application. This particular apparatus is adapted to be used in conjunction with equipment especially designed for bending the preformed helical rods to form the aforementioned dead-ends. Normally such equipment consists in essence of a pin member about which the helically preformed rods or in actuality a band of the same are bent, as will be described more fully hereinafter.

Referring now to FIGURE 1, the apparatus 10 embodying the invention includes a frame constructed of two upright supports 12 secured at their upper ends by the cross member 14 and intermediate their ends by the cross members 16. While the frame is of a conventional construction adapted to be used with many types of bending apparatus, it will be apparent that various modifications of the frame, in order to adapt it to specific types of bending apparatus, may be made in order to accommodate the latter.

A support member 18 is slidably secured to each of the vertical members 12 by a collar 20 but may be fixed in a selected position by a set screw 22. The support members 18 are provided with a pivot pin 24 at their inner ends, as shown in the drawing. The distance of the pivot pins 24 from their associated vertical members may be varied, of course, by slidably positioning the support members 18 within the collars 20.

Secured to each of the support members 18 by the pivot pins 24 are the pendulum members 26. The pendulum members 26 are pivotally mounted on the pins 24 intermediate their ends and normally rest in a vertical position substantially parallel to the members 12. A weight 27 may be affixed to each of the pendulum members at their ends to facilitate their return to the vertical or other normal position. Each of the pendulum members 26 is secured to a pivot point 28 intermediate the ends of the cross member 16 by means of a bell crank mechanism, generally denoted by the numeral 29. The bell crank mechanism in this form consists of the levers or links 30, 32 and 34. The link 30 is pivotally secured to the pivot point 28 intermediate its ends and is pivotally secured at its ends to the ends of the links 32 and 34. The latter in turn are pivotally secured at their other ends to the pendulum members. It can be seen that, as a result of the bell crank mechanism which interconnects the two pendulum members 26, the rotation of one will cause the rotation of the other in the opposite direction. In other words, if the upper end of one onf the pendulum members moves away from a center point that is between the two when they are in their normal positions, then the upper end of the other pendulum member will move away from the center point in the opposite direction. By constructing the bell crank mechanism of links and levers of predetermined dimensional relationships as well as affixing them to the pendulum members at predetermined pivotal points, the displacement of the end of one relative to the other can be maintained in a predetermined ratio. In fact, as will be seen later on, the distances that each of the pendulums is spaced from the center point will normally be of the same magnitude and may differ by a fraction of a pitch length, but in any event the displacement of the two will be substantially equal, as will be seen hereinafter.

At the upper end of each pendulum 26 is a section 38 having the bore 40. The bore 40 is adapted to receive the dowel 42 and to hold it in fixed relationship by means of the set screw 44. Each dowel 42 has secured at its upper end the centering pin assembly which is shown in detail in FIGURE 3, and is generally denoted by the numeral 46. The centering pin assembly consists of the yoke 48 which may be formed integrally with the dowel 42 or in some conventional manner. The yoke 48 is provided with the apertures 50 which receive the spindle 52 as shown in the drawing. A cylindrical member 54 is rotatably mounted on the pin 52 by means of the journals 56.

Referring now to FIGURES 4 through 4d, there is shown an idealized illustration of the helically preformed elements 57 which form the open pitch or helical band portions 58a and 58b and the closed pitch portion 59 when used in conjunction with the apparatus embodying the invention. As was mentioned previously, the pendulum members 26 are mounted so that the pin members are presented at distances of the same magnitude from a center point, although such distances may differ by a fraction of a pitch length.

In FIGURE 4 one form of the bending apparatus is shown as including the bending pin 60 mounted on the support member 62 and a pair of pivotally mounted bending arms 66 actuated by suitable drive means, such as a pair of hydraulic jacks (not shown). In this instance the cylinders are mounted in a horizontal direction which is transverse to the pin 60, in order to facilitate the manipulation of the helical elements 57 by the operator. The cylinders 54a and 54b are normally positioned so that, when the associated portions 58a and 58b of the helical band are brought into the previously described chordal relationship, the closed portion will be presented to the bending pin so that the portions 58a and 58b are in opposite phase relationship, if the actual helical dimensions conform to those selected.

As a result of the transverse relationship between the cylinders 54 and the pin 60, it is not possible to position the former at distances exactly equal from the latter, as will be described hereinafter. For purposes of convenience, the cross-section shown in FIGURE 4a is assumed as the arbitrary starting point for each pitch length, so that at the next quarter turn the helical elements 57 would appear as in FIGURE 4b and at the next as in FIGURE 4c and finally at the last as in FIGURE 4d. At the next quarter turn the cross-section would be the same as that shown in FIGURE 4a, thus completing one pitch length. Assuming that the cylinders 54 are to be presented at a distance as close to being equal as possible with the distance being in the magnitude of 2 feet from the bending pin 60 and that a normal pitch length is 6 inches, then the cylinder 54a would normally be positioned at 2 feet and 1½ inches from the bending pin in order that the section 4d would be presented to the cylinder. The 1½ inches results from the fact that an extra one-quarter of a pitch length must be included in the total distance between the pin and the cylinder in order to present the latter with the closest proper cross-section of the helical band.

Conversely the right hand cylinder 54b, in order to contact the helical band at a cross-section corresponding to that shown in FIGURE 4d, would be spaced at a distance of 1 foot and 10½ inches from the bending pin 60. The difference of 1½ inches from the assumed distance of 2 feet is the result of the fact that the closest cross-section corresponding to that shown in FIGURE 4d and to the desired 2 feet occurs at one and three-quarters pitch lengths. It can now be seen that the difference between the distances of the cylinders 54a and 54b from the bending pin 60 is 3 inches or one-half of a pitch length or 180° of a pitch length. Thus it can be seen that when the cylinders 54a and 54b are transverse to the pin member 60, the former may be positioned according to the following formula:

1. $$\frac{L}{2}+\frac{P_L}{4} \neq \frac{L}{2}-\frac{P_L}{4}$$

wherein L is the total distance between the two cylinders 54 and $P_L$ is the pitch length It is to be noted that if the cylinders 54a and 54b were mounted with their axes parallel to the bending pin, then they would normally be positioned at equal distances therefrom. Thus, each of the cylinders 54a and 54b in that case, for example, could be positioned at two pitch lengths from the bending pin. The reason for the rotation of the cylinders with respect to the bending pin so as to be at right angles thereto is the ease of operation and manipulation of the helical bands formed by the helically preformed armor rods.

If the internal face of the helical band is brought into engagement with the pin in any relationship other than that shown in FIGURE 5, and an attempt is made to bend the band about the pin, the band will naturally assume the relationship shown in FIGURE 5 if allowed to rotate about its own axis.

The operation of the apparatus will now be described. For purposes of simplicity it is assumed that the cylinders 54 are unequally spaced from the pin with the difference being one-half pitch length and the normal distance between the two cylinders being 4 feet which is the normal distance between two corresponding cross-sections. As long as the distance between two corresponding sections remains as 4 feet, then the cylinders 54a and 54b can remain in their normal positions and still assume the relationship shown in FIGURE 5 with their respective helical band portions 58. If, however, the distance between the two cross-sections should vary such that the distance should become 4 feet and 4 inches, then it will be necessary to displace the cylinders in order that the helical bands 57 may be seated in the same manner as when the distance is 4 feet. Since the increased distance is 4 inches, half of which would be 2 inches, then each of the cylinders will of necessity move the latter distance. With the construction previously described, the increased distance is automatically divided so that the helical bands are in opposing phase relationship when the helical elements are bent about the pin 60.

Referring back to FIGURE 4 once the helical elements are properly positioned, the bending arms 66 sweep or bend the helices about the pin member 60, as indicated by the dotted lines. It can be seen that the closed helical portion 59 forms the bight of the dead-end and that the open pitch portions or legs would form the body gripping portion. When the helical band or the armor rod are centered properly, the end portions will be of opposite phase relationship so that they may be readily intertwisted to form a closed sheath or at least a partial sheath.

It can now be seen that the subject invention is not limited to a construction in which the horizontal cylinders 54a and 54b are positioned at spaces approximately equal from the pin. In fact, the cylinders may be positioned at unequal, whole number, multiples of the pitch length so that these whole numbers may be substituted for the half-lengths in the previously given formula. For example, the cylinders could be positioned according to the following general formula:

2. $$(A \times P_L)+(P_L \times X) \neq (B \times P_L)-(P_L \times X)$$

where A and B are finite numbers or integers, for example; $P_L$ is the approximate pitch length; and where X is equal to the fractional pitch length represented by the angular displacement at which the cylinders are fixed from an angle normal to the plane in which bending occurs.

In the form shown in FIGURE 2, $P_L \times X$ would equal $$\frac{P_L}{4}$$

since the angle of displacement is 90° which represents one-quarter of a pitch length. However, if the cylinders are parallel with the bending pin, then X would be zero, and if mounted at 45° from the vertical direction, then X would be one-eighth.

As was mentioned previously, the bending of a partial lay assembly around a pin or in the opposite direction in the same plane after assuming the chordal relationship will result in the legs being in an opposite phase relationship. It has been found that if the partial lay is bent around the pin, the loop or bight portion will contain an odd number of pitch lengths, i.e. 3, 5, 7, etc. Conversely, if the partial lay is bent away from the pin after assuming the chordal relationship, then the bight portion will contain an even number of pitches, i.e., 2, 4, 6, etc. Thus, regardless of the direction of bending in the bending plane, the bight size is limited to some whole number multiple of the pitch length when the bight portion is constructed from the same open helix as the legs. For purposes of convenience, hereinafter the odd pitch length data will be designated by the letter "a" followed by a numeral and the even pitch length data by the letter "b" followed by a numeral. Thus the odd and even pitch length data set forth previously in this paragraph would appear as (a1)—3, 5, 7, etc. and (b1)—2, 4, 6, etc., respectively.

It will now be apparent that when the bight is constructed from a helix twisted closed that the restriction on size is not present. The twisting operation to form the closed helix may cause one leg to be displaced a part of a revolution relative to the others. In other words, the two points at which the closed helix begins while originally of the same phase may assume positions of different phase. Of course, this is true of any two points which were originally of the same phase relationship prior to the twisting operation. A corollary to this proposition is that two points originally of different phase relationship may be positioned in the same phase after the twisting.

As a result of the possibility of displacement in phase relationship by the twisting, the size of the bight portion is no longer limited to whole number pitch lengths, either odd or even integers. For example, after a given twisting operation, the bight, if bent around the pin, may consist of the equivalent of (a2)—3.4, 5.4, 7.4, etc., pitch lengths which can be designated odd pitch plus lengths. Conversely, if bent away from the pin, the bight size may consist of the equivalent of (b2)—2.4, 4.4, 6.4, etc., pitch lengths which can be designated even pitch plus lengths.

Moreover, by varying the amount of twisting, the bight portion may consist of the equivalent of (a3)—3.7, 5.7, 7.7, etc. or (b3)—2.7, 4.7, 6.7, etc., which can be designated the odd pitch plus and even pitch plus lengths, respectively, depending upon the direction of the bending.

Thus it can be seen that as the result of constructing the bight from a fully twisted helix, much greater freedom exists for loop size design.

It should be noted that the portion consisting of the closed helix may be formed by either twisting the elements, as mentioned previously, or by stretching the same until the helix is closed or a combination of twisting and stretching. The word twisting, however, shall cover all three situations since the descriptive material relating to a closed helix is applicable in each instance.

After the twisting operation, in order to provide for the correct phasing of the legs, it is necessary to rotate the partial lay about its longitudinal axis until the proper plane for bending is turned into the plane in which the bending takes place. Prior to this invention, the positioning operation was more or less a trial and error procedure. In essence, the procedure consisted of adjusting the position of the partial lay by means of two rigid bars mounted on the bending machine. The partial lay was positioned on the bars so that the loop portion would be equally divided at the bending point or if displaced, the displacement would be by one full pitch or a multiple thereof. An inspection of the data on lines (a) and (b) shows that this division is merely a division of the amount by which the data deviates from one of the whole odd or even numbers. In other words, if the displacement is such as to indicate a loop length in accordance with the lengths on line (a3), the half-set can be rotated into a position so that the pitch length equivalents assigned to each leg will be (a4)—1.85, 2.85, 3.85, etc. By rotating a part turn in the opposite direction so as to correspond with (b3), the assignments become (b4)—1.35, 2.35, 3.35, 4.35, etc.

It can now be seen that when legs are out of their original phase relationship as a result of the twisting operation, the general formula for the positions of the cylinders 54a and b becomes

3.

$$(A \times P_L) + (P_L \times X) + \frac{D}{2} = (B \times P_L) - (P_L \times X) + \frac{D}{2}$$

where D is the angular displacement between the two legs expressed in terms of the equivalent fractional length corresponding thereto and where the remaining symbols are the same as those in Formula 2.

Thus it can now be seen that another feature of the subject invention is the division of the angular displacement of the legs resulting from the twisting operation. The division is accomplished by displacing each of the cylinders 54a and 54b a predetermined amount, the sum of the amounts being equal to the fractional pitch length corresponding to the angular displacement. The apparatus is then balanced by means of weights or springs so that the cylinders 54a and 54b will normally assume the displaced positions. Thus, when a helical band having the desired dimensions is placed on the cylinders 54a and 54b, it will normally rotate of its own weight to assume a chordal relationship therewith. If the pitch of the helical elements should vary slightly due to manufacturing tolerances and other unforeseen difficulties, the weight of the helically preformed elements should displace from their normal positions the cylinders 54a and 54b sufficiently to accommodate the variations. Thus as an additional feature the invention is so constructed that, once it is balanced, the weight of the helically preformed elements will displace the cylinders 54a and 54b so as to automatically compensate for any minor variations present and at the same time the weight will cause the helically preformed elements to rotate about the helical axis until they assume the desired chordal relationship so that the bending operation can be performed.

With the present invention the set-up of the positioning apparatus is accomplished by adjusting the horizontal cylinders and the bending pin to normally assume a chordal relationship with untwisted partial lays. Then a choice is made between "odd or even" according to which is the closest to the desired loop size as available in lines (a) or (b). The vertical cylinder supports are then limited in their movement as the result of the biasing by a weight at the bottom or by means of a spring. Thereafter, when a twisted half-set is placed on the two horizontal cylinders, the weight of the same will cause the cylinders to move inward or outward until they have assumed the chordal relationship. The variation from a whole number will be equally divided between the respective legs of the half-set so that they are in the proper phase relationship.

From the foregoing it is now apparent that the apparatus embodying the invention is of a relatively simple construction that may be utilized in conventional apparatus. The invention may be readily operated without any particular skills or effort.

Referring now to FIGURES 6 and 7, there are shown two modifications of the invention. In FIGURE 6 the modification includes the frame members 12 and the pendulum members 26 which are pivotally secured to the former. The pendulum members 26 are interconnected by means of the cross member 70 which intercepts the former at 90° when in their normal positions. The cross member may include a turnbuckle 70a for adjusting the normal positions of the pendulum members 26. This particular construction is primarily designed for operations in which the total variation is small. This construction causes the rotation of the members 26 to be in opposite directions. By the selection of the appropriate lengths of pendulum members 26 and the proper pivot points it is possible to maintain the displacement of pendulum members with respect to the center point to be equal.

In FIGURE 7 there is shown another modification of the invention which includes the pendulum members 26 secured to the frame members 12. At their lower ends the pendulum members 26 are secured to the belt 71 mounted on the pulleys 72. The end of one of the members 26 is secured to the belt on one side of the axes of the pulleys 72 with the end of the other member 26 being secured to the belt on the other side of the axes of the pulley members 72. Thus as indicated by the arrows in the drawing, the movement of the pendulum member, secured to the upper side of the belt, to the right will cause movement of the corresponding end of the other pendulum member in the left or opposite direction. By the selection of the proper pivot points and distances it is possible to maintain the equality of the displacement of the two pendulum members.

It will be noted that, although certain specific embodiments have been shown and have been described in the specification, these embodiments are merely by way of example and in no manner are to be construed as limitations. It will be apparent that certain modifications may be made within the scope of the claims without departing from the spirit of the invention.

What is claimed is:

1. Apparatus for positioning a helical band comprising means for forming a line substantially transverse to the axis of the helical band, and a pair of cylinder members laterally spaced from said line and mounted so as to engage the helical band in a chordal relationship while the band is in close association with said line.

2. Apparatus for positioning a helical band with respect to a reference point comprising a reference point, a pair of pivoted members laterally spaced from said reference point, and a cylinder member mounted on each of said pivoted members so that both of the same may engage a helical band in a chordal relationship while the band is in close association with said reference point.

3. Apparatus for positioning a helical band with respect to a reference point comprising a reference point, a pair of pivoted members laterally spaced in opposite directions from said reference point, a cylinder member mounted on each of said pivoted members so that both of the same may engage a helical band in a chordal relationship while the band is in close association with said reference point, and means for interconnecting said pivoted members so that pivotal movement of one of said members causes pivotal movement of the other in the opposite direction.

4. Apparatus for positioning a helical band with respect to a reference point comprising a reference point, a pair of pivoted members laterally spaced in opposite directions from said reference point, a cylinder member mounted on each of said pivoted members so that both of the same may engage a helical band in a chordal relationship while the band is in close association with said reference point, and a bell crank means interconnecting said pivoted members so that pivotal movement of one member causes pivotal movement of the other of said pivoted members in the opposite direction.

5. Apparatus for positioning a helical band with respect to a reference point comprising a reference point, a pair of pivoted members laterally spaced in opposite directions from said reference point, a cylinder member mounted on each of said pivoted members so that both of the same may engage a helical band in a chordal relationship while the band is in close association with said reference point, and cross bars pivotally interconnecting said pivoted members so that pivotal movement of one of said members causes pivotal movement of the other member in the opposite direction.

6. Apparatus for positioning a helical band with respect to a reference point comprising a reference point, a pair of pivoted members laterally spaced in opposite directions from said reference point, a cylinder member mounted on each of said pivoted members so that both of the same may engage a helical band in a chordal relationship while the band is in close association with said reference point, and an endless belt mounted on a pair of spaced pulley members, one of said lever members being secured to the portion of said belt on one side of the axes of said pulley members and the other of said lever members being secured to the portion of the belt on the other side of the axes so that pivotal movement of one of said members in one direction causes pivotal movement of the other of said members.

7. Apparatus for positioning a helical band with respect to a reference point comprising a reference point, a pair of pendulum members laterally spaced in opposite directions from said reference point and normally disposed in a vertical direction, a cylinder member mounted on the upper end of each of said pendulum members and spaced so as to engage corresponding cross-sections of a helical band in a chordal relationship while the band is in close association with said reference point, and means for interconnecting said pivoted members so that pivotal movement of one of said members causes pivotal movement of the other in the opposite direction, whereby said pendulum members may be pivoted in order to bring said cylinder members into engagement with said corresponding cross-sections to accommodate variations in the distance between the same.

8. An apparatus for positioning and bending a helical band comprising a pin member about which said helical band is adapted to be bent, a pair of pendulum members laterally spaced in opposite directions from said pin member and normally disposed in a vertical direction, a cylinder member mounted at the upper end of each of said pendulum members and spaced so as to engage corresponding cross-sections of the helical band in a chordal relationship while the band is in close association with said pin member, means for interconnecting said pivoted members so that pivotal movement of one of said members causes pivotal movement of the other in the opposite direction whereby said pendulum members may be pivoted in order to bring said cylinder members into engagement with said corresponding cross-sections to accommodate variations in the distance between the same, and means for bending the helical band about said pin member.

9. An apparatus for positioning and bending a helical band comprising a pin member about which said helical band is adapted to be bent, a pair of pivoted members laterally spaced in opposite directions from said pin member, a cylinder member mounted on each of said pivoted members so that both of the same may engage a helical band in a chordal relationship while the band is in close association with said pin member, means for interconnecting said pivoted members so that pivotal movement of one of said members causes pivotal movement of the other in the opposite direction, and means for bending said helical band about said pin member.

10. A method for manufacturing a bight from a linear element having a helical band portion of open pitch adjacent each end interconnected by an intermediate portion comprising placing each of said helical band portions in chordal association with a pair of spaced cylindrical pin members and then bending said helical element about a preselected bending point so that said helical band portions at corresponding points are of a predetermined phase relationship.

11. A method according to claim 10 in which the axes of said spaced cylindrical pin members are parallel and including the step of positioning said pin members with respect to said preselected bending point according to the following formula:

$$(A \times P_L) + \frac{P_L}{X} \neq (B \times P_L) - \frac{P_L}{X}$$

where $P_L$ is the pitch length; A and B are finite numbers; and $$\frac{P_L}{X}$$

is the fractional pitch length represented by the displacement of the axes of said cylindrical pin members from an angle normal to the plane in which bending occurs.

References Cited in the file of this patent

UNITED STATES PATENTS

| | | |
|---|---|---|
| 1,761,482 | Laubenthal | June 3, 1930 |
| 1,823,886 | Clark | Sept. 22, 1931 |
| 2,414,136 | Bodendieck | Jan. 14, 1947 |

FOREIGN PATENTS

| | | |
|---|---|---|
| 542,601 | Germany | Jan. 27, 1932 |